United States Patent [19]

Grunberg

[11] 4,363,524
[45] Dec. 14, 1982

[54] BRAKING SYSTEM WITH ANTI-LOCK CIRCUIT

[75] Inventor: Pierre Grunberg, Paris, France

[73] Assignee: Valeo, Paris, France

[21] Appl. No.: 192,379

[22] Filed: Sep. 30, 1980

[30] Foreign Application Priority Data

Oct. 2, 1979 [FR] France ............................ 79 24463

[51] Int. Cl.³ .......................................... B60T 17/18
[52] U.S. Cl. .................................................. 303/92
[58] Field of Search .................... 303/92, 95, 110, 115

[56] References Cited

FOREIGN PATENT DOCUMENTS

| 2332297 | 1/1974 | Fed. Rep. of Germany | 303/92 |
| 2549587 | 5/1977 | Fed. Rep. of Germany | 303/92 |
| 2306856 | 11/1976 | France | 303/92 |
| 1439930 | 6/1976 | United Kingdom | 303/92 |
| 2004340 | 3/1979 | United Kingdom | 303/92 |

Primary Examiner—Duane A. Reger
Attorney, Agent, or Firm—Charles E. Brown

[57] ABSTRACT

A braking system of the kind which comprises, for each front axle and each rear axle, at least one servo-operated control valve actuated by an anti-locking circuit which comprises a monitoring part and a control part, the electrical supply of the former being regulated by a safety switch controlled by the latter.

According to the invention, the safety switch linked to the front axle is in series with the safety switch linked to the rear axle and is downstream thereof in relation to the corresponding current source. This de-activates the anti-locking circuit of the front axle in the event of failure of the anti-locking circuit of the rear axle, thus minimizing the possibility of locking of the rear wheels only during braking.

1 Claim, 1 Drawing Figure

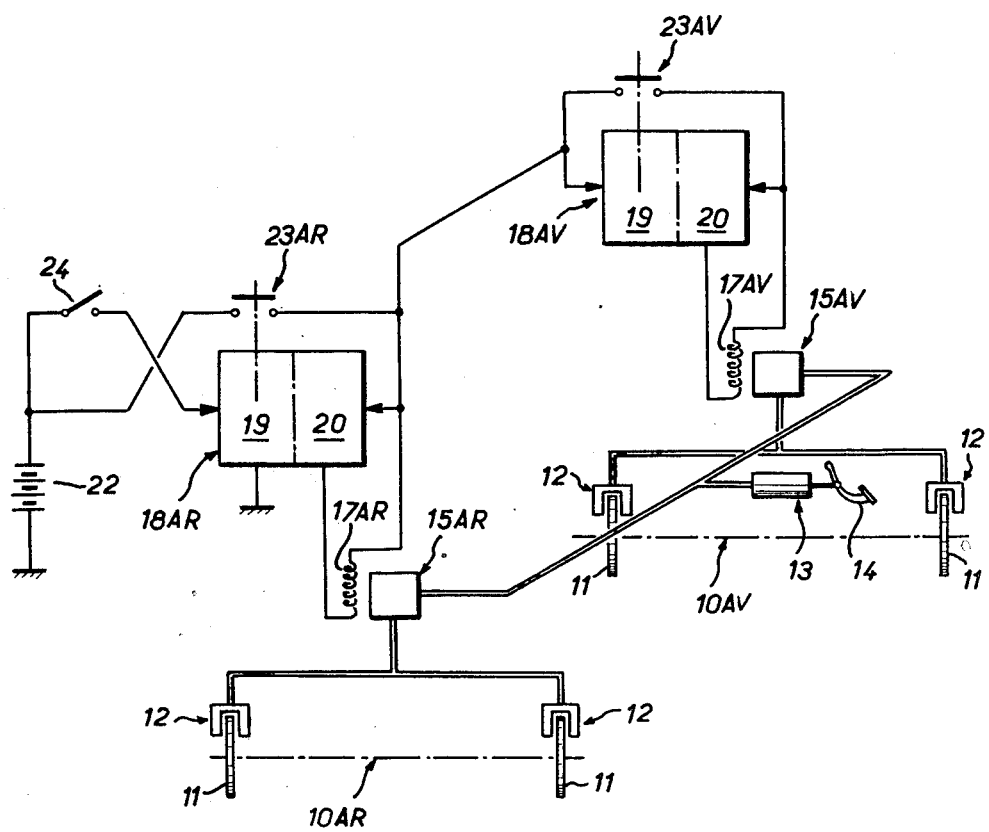

BRAKING SYSTEM WITH ANTI-LOCK CIRCUIT

BACKGROUND OF THE INVENTION

The present invention relates generally to braking systems for motor vehicles which, as is well known, have at least one front axle and at least one rear axle, and each of whose wheels is equipped with a braking device such as a drum brake, a disc brake or a crown brake. The invention relates more particularly to those braking systems which comprise, for each of the said axles, at least one servo-operated control valve which is linked to at least one of the wheels carried by such an axle and which is connected to an anti-locking circuit belonging to the said axle and having a monitoring part and a control part, the electrical supply of the control part being regulated by a safety switch controlled by the monitoring part.

Such a braking system is described, for example, in the French Pat. No. 2,306,856.

In a braking system of this kind, the purpose of the monitoring part of the anti-locking circuit is, for reasons of safety, to effect at specific intervals an examination of all the functions of the anti-locking circuit and to control the operation of the safety switch, which ensures the supply to the control part thereof and thus enables it to act effectively, only if at least some of the said functions are truly capable of being carried out.

In the event of failure in any one of the said functions, the safety switch is left in or is controlled to assume the opening position, thereby rendering the corresponding anti-locking circuit inoperative.

From then on, once the wheels of the axle in question are not subject, during a braking action, to any monitoring by an anti-locking circuit, the wheels can become locked, if braking is excessive, with the attendant risks inherent in such a situation.

In hitherto known systems of this kind, the safety switches connected to the various axles of the vehicle are connected in series.

The result is that, during a braking action, on the assumption of a failure in the anti-locking circuit of the rear axle, the wheels of this rear axle may become locked, whereas, with the anti-locking circuit of the front axle being correctly in operation, the same is not true of the front wheels.

As is known, loss of control at the driving end of a vehicle, which is usually caused by locking of its rear wheels, generally results in a skid which is always dangerous.

It is an object of the present invention to provide a braking system which enables this disadvantage to be avoided.

SUMMARY

The invention provides a braking system for a vehicle having at least one front axle and at least one rear axle, of the kind which comprises, for each axle, at least one servo-operated control valve which is connected to at least one of the wheels carried by the axle and which is driven by an anti-locking circuit belonging to the axle which circuit has a monitoring part and a control part, the electrical supply of the control part being regulated by a safety switch controlled by the monitoring part; the braking system is characterised in that the safety switch linked to the front axle is connected in series with the safety switch linked to the rear axle and is downstream thereof in respect of the corresponding current source.

Thus, in the event of a failure located in the anti-locking circuit linked to the rear axle, not only is this anti-locking device rendered inoperative under the control of its own monitoring part, but also the anti-locking circuit of the front axle is rendered inoperative, the electrical supply of the control part of this circuit being interrupted at the same time as the control part of the anti-locking circuit of the rear axle.

In other words, if, in the event of such a failure, braking proves to be sufficiently excessive to cause locking of the rear wheels, locking of the front wheels would normally occur at the same time, which is much more preferable in terms of preventing loss of control of the vehicle.

BRIEF DESCRIPTION OF THE DRAWING

The schematic drawing comprises a single FIGURE representing a block diagram of a braking system according to the invention.

DETAILED DESCRIPTION OF THE PREFERRED EMBODIMENT

In the drawing the front axle of a motor vehicle is shown schematically by a broken line 10AV and the rear axle thereof is shown schematically by a broken line 10AR.

A rotary device to be braked, for example a disc 11, as shown schematically in the figure, is connected to each of the wheels carried by the respective axle, and a braking device 12 is associated with each disc.

The drawing shows by way of example, a hydraulically controlled braking device whose supply of fluid under pressure from a hydraulic circuit controlled by a master cylinder or a dosing device 13, itself driven by a manually operated brake pedal 14, is regulated by at least one servo-operated control valve for each axle.

The hydraulic circuit is only shown schematically in the figure and, since it is not part of the present invention, it will not be described in detail here.

In the embodiment illustrated, a single servo-valve 15AV is provided for the front axle 10AV, which controls in parallel the two braking devices 12 linked to the said axle and, likewise a single servo-valve 15AR is provided for the rear axle 10AR, which controls in parallel the two braking devices 12 linked to this axle.

For each axle 10AV, 10AR, the respective servo-valve 15AV, 15AR is actuated, via a coil 17AV, 17AR, by an anti-locking circuit 18AV, 18AR belonging to the respective axle and having a monitoring part 19 and a control part 20.

As mentioned above, the purpose of the monitoring part 19 is to examine at regular intervals the satisfactory operating state of at least some of the components of the anti-locking circuit in question in order to ensure, for obvious reasons of safety, that his anti-locking circuit is effectively capable of assuming its proper functions.

As regards the control part 20, its purpose is effectively to control the coil of the corresponding servo-valve.

The composition of such an anti-locking circuit having a monitoring part and a control part is in itself well known, notably from the abovementioned French patent, and since it is not part of the present invention, it will not be described in detail here.

Of sole importance for the account of the invention is the arrangement whereby the electrical supply to the control part 20 of an anti-locking circuit 18AV, 18AR from the corresponding current source 22, which is, in practice, the battery of the vehicle in question, is regulated by a safety switch 23AV, 23AR controlled by the monitoring part 19 of the respective anti-locking circuit 18AV, 18AR, the electrical supply to this monitoring part 19 being itself ensured directly by the current source 22, regulated by the master switch 24 of the vehicle, which is controlled conventionally by an ignition key.

According to the invention, the safety switch 23AV linked to the front axle 10AV is in series with the safety switch 23AR linked to the rear axle 10AR and is downstream of same in respect to the corresponding current source 22.

Thus, if, as a result of a failure in the anti-locking circuit 18AR of the rear axle 10AR, the safety switch 23AR associated with this axle 10AR is left in or controlled to assume an opening position which renders this anti-locking circuit 18AR inoperative, the anti-locking circuit 18AV of the front axle 10AV is also rendered inoperative, whatever its true operating state, its electrical supply being systematically interrupted when the safety switch 23AR linked to the axle 10AR is in the open position.

It has been assumed in the foregoing text that one and the same servo-operated control valve is linked to the two braking devices of each respective axle.

It goes without saying that, in a manner which is in itself known, a separate servo-operated control valve can be provided for each of these braking devices, the valves for the same axle being controlled independently of one another by the control part 20 of the corresponding anti-locking circuit.

Likewise, it has been assumed in the foregoing text that the vehicle in question has only one rear axle. In the event that more than one is provided, the safety switches of these axles are preferably, according to the invention, connected in parallel to the terminals of an AND gate, so that the electrical supply of the anti-locking circuit of the front axle is interrupted only if the safety switches of the rear axles are all in the open position.

In other words, the cutting-out of the anti-locking circuit of the front axle, (or of the front axles when there are several front axles), takes place only if all the rear axles have a failed anti-locking circuit, unless of course, the anti-locking circuits of the front axle or axles have cut out automatically.

The present invention is not, of course, limited to the embodiment described and illustrated, but encompasses alternative forms.

Moreover, its application is not limited to hydraulically controlled braking systems, but extends to cases where the control is, for example, pneumatic or otherwise, whatever the type of brakes used, which can be disc, drum or crown brakes or even comprise shoes.

Furthermore, the expressions "braking system" and "servo-operated control valve" must be interpreted broadly, since the invention can also be applied to certain slowing systems.

I claim:

1. A braking system for a motor vehicle having at least one front axle and at least one rear axle, said braking system comprising a front axle servo control valve and a rear axle servo control valve associated with at least one wheel of the respective axles, a front axle anti-locking circuit and a rear axle anti-locking circuit respectively connected to said front wheel servo control valve and to said rear wheel servo control valve for actuating the same, each of said anti-locking circuits comprising monitoring means and control means, a safety switch operated by each of said anti-locking circuit montoring means for controlling the power supply to the associated one of said control means, said safety switch for said front axle anti-locking circuit being remote from said power supply relative to said rear axle anti-locking circuit, whereby said safety switch for said rear axle anti-locking circuit may remain closed and said rear axle anti-locking circuit operative in case said safety switch for said front axle anti-locking circuit opens, but when said safety switch for said rear axle anti-locking circuit is open said front axle anti-locking circuit is rendered inoperative.

* * * * *